(12) United States Patent
Vukich et al.

(10) Patent No.: US 12,117,993 B2
(45) Date of Patent: *Oct. 15, 2024

(54) SYSTEMS AND METHODS FOR AUTOMATED RECOVERY OF BLOCKCHAIN-BASED ACCOUNTS

(71) Applicant: Capital One Services, LLC, McLean, VA (US)

(72) Inventors: Adam Vukich, Alexandria, VA (US); Kevin P. Kelly, Austin, TX (US); Adnan Malik, Voorhees, NJ (US); Mykhaylo Bulgakov, Arlington, VA (US); William Carroll, Huntingtown, MD (US); Steven Quadros, New York, NY (US); Abdelkader Benkreira, New York, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,245

(22) Filed: Jul. 11, 2023

(65) Prior Publication Data

US 2023/0350881 A1    Nov. 2, 2023

Related U.S. Application Data

(63) Continuation of application No. 16/862,669, filed on Apr. 30, 2020, now Pat. No. 11,741,082.
(Continued)

(51) Int. Cl.
*G06F 16/23* (2019.01)
*G06Q 10/10* (2023.01)
(Continued)

(52) U.S. Cl.
CPC ...... *G06F 16/2379* (2019.01); *G06F 16/2365* (2019.01); *G06Q 10/10* (2013.01); *G06Q 20/36* (2013.01); *H04L 63/083* (2013.01)

(58) Field of Classification Search
None
See application file for complete search history.

(56) References Cited

U.S. PATENT DOCUMENTS 10,790,976 B1 * 9/2020 Raevsky .............. G06Q 20/065
2017/0372300 A1 12/2017 Dunlevy et al.
(Continued)

OTHER PUBLICATIONS

"Smart Contracts : The Blockchain Technology That Will Replace Lawyers," (https://blockgeeks.com/guides/smart-contracts/); 2016.

*Primary Examiner* — Irene Baker
(74) *Attorney, Agent, or Firm* — TROUTMAN PEPPER HAMILTON SANDERS LLP; Christopher J. Forstner; John A. Morrissett

(57) ABSTRACT

A method of recovering blockchain wallet items, the method including: configuring a first smart contract to authorize a second smart contract to initiate transfer of one or more wallet items registered to the first smart contract to a location specified by the second smart contract; configuring the second smart contract to initiate transfer of the one or more wallet items from the first smart contract in response to receiving a first recovery verifier; receiving, via an API and by the second smart contract, a wallet recovery request associated with the first smart contract, the wallet recovery request specifying a third smart contract as being a recipient wallet; and based on the wallet recovery request and responsive to receiving the first recovery verifier, initiating, by the second smart contract, a transfer of the one or more wallet items from the first smart contract to the third smart contracts.

20 Claims, 5 Drawing Sheets

Related U.S. Application Data

(60) Provisional application No. 62/842,231, filed on May 2, 2019.

(51) Int. Cl.
  *G06Q 20/36* (2012.01)
  *H04L 9/40* (2022.01)

(56) References Cited

U.S. PATENT DOCUMENTS

| | | |
|---|---|---|
| 2019/0220852 A1 | 7/2019 | Black et al. |
| 2020/0005282 A1 | 1/2020 | Kim |
| 2020/0119916 A1* | 4/2020 | Pickhardt .............. H04L 9/3226 |
| 2020/0313853 A1 | 10/2020 | Verma et al. |
| 2021/0083872 A1* | 3/2021 | Desmarais .............. G06F 21/74 |

* cited by examiner

SYSTEMS AND METHODS FOR AUTOMATED RECOVERY OF BLOCKCHAIN-BASED ACCOUNTS

CROSS REFERENCE TO RELATED APPLICATIONS

This application is a continuation of, and claims priority under 35 U.S.C. § 120 to, U.S. patent application Ser. No. 16/862,669, filed Apr. 30, 2020, which claims priority under 35 U.S.C. § 119 to U.S. Provisional Patent Application No. 62/842,231 filed May 2, 2019, the entire contents of each of which are fully incorporated herein by reference FIELD The present disclosure relates to automated recovery and, more particular, to automated recovery of blockchain-based accounts.

BACKGROUND

Blockchain technology utilizes distributed ledgers to ensure the reliability of the transactions posted to the blockchain. By "mining" for new blocks, new transactions are recorded in the ledger and old transactions are further secured. The use of blockchains has enabled the use of crypto-currencies, as well as more-secure, distributed record systems. Blockchain wallets are repositories for goods and records stored on the blockchain. Blockchain wallets allow anyone with the corresponding key access to all goods stored therein. In other words, if a malicious third-party acquires a wallet's key, that third-party can remove all assets from the wallet. Because of the sensitive nature of the wallet's key, they are most commonly stored offline in, for example, a thumb drive. However, if the storage is lost or corrupted, a user typically has no way of recovering the assets form the wallet. Recent estimates suggest that millions of bitcoins valued at billions of dollars have already been lost by being locked out of wallets. As additional assets (such as deeds, bank accounts, etc.) are moved to blockchain systems, such losses may only increase. To avoid this loss, users may make copies of the keys, utilize storage managers, or write the keys down. However, such traditional methods are insecure, and can work against the purpose for private keys. Thus, traditionally, in order to maintain their private keys, users could ultimately compromise the underlying assets, exchanging one loss for another.

Accordingly, there is needed systems and methods for providing secure wallet recovery. Furthermore, provide secure recovery of block-chain based wallets by hybridizing both blockchain and off-blockchain systems. Certain aspects of the present disclosure address these and other issues.

SUMMARY

According to some embodiments, there is provided a method of recovering blockchain wallet items, the method including: configuring a first smart contract to authorize a second smart contract to initiate transfer of wallet items registered to the first smart contract to a location specified by the second smart contract; configuring the second smart contract to initiate transfer of the wallet items from the first smart contract in response to receiving a first recovery verifier; receiving, via an API and by the second smart contract, a wallet recovery request associated with the first smart contract, the wallet recovery request specifying a third smart contract as being a recipient wallet; and based on the wallet recovery request and responsive to receiving the first recovery verifier, initiating, by the second smart contract, a transfer of the wallet items from the first smart contract to the third smart contract.

The method may further include: configuring the third smart contract to authorize the second smart contract to initiate transfer of wallet items registered to the third smart contract to a location specified by the second smart contract; and configuring the second smart contract to initiate transfer of the wallet items from the third smart contract in response to receiving a second recovery verifier.

The second recovery verifier may be identical to the first recovery verifier.

The method may further include instantiating, by the second smart contract, the third smart contract.

Initiating the transfer of the wallet items from the first smart contract to the third smart contract may include initiating a transfer of a portion of the wallet items from the first smart contract to the second smart contract.

The wallet recovery request may be received from a user account associated with the first smart contract.

The first recovery verifier may include receiving a multi-signal trigger from a plurality of verifier smart contracts.

The method may further include configuring the second smart contract to accept the multi-signal trigger from the plurality of verifier smart contracts.

The multi-signal trigger may include a predetermined passcode sent from each of the plurality of verifier smart contracts.

According to some embodiment, there may be provided a method of recovering blockchain wallet items, the method including: receiving, from a user device, log-in credentials associated with a user account; receiving, from the user device, an indication that a key associated with a user smart wallet associated with the user account has been lost; initiating a validation and recovery process for items stored in the user smart wallet; instantiating a recovery smart wallet; transferring the items stored in the user smart wallet to the recovery smart wallet; and associating the recovery smart wallet with the user account.

The method may further include configuring the recovery smart wallet to authorize a recovery agent to initiate transfer of wallet items registered to the recovery smart wallet to a location specified by the recovery agent.

The method may further include receiving, from a plurality of verifier smart contracts, a predetermined recovery phrase, wherein the verifier smart contracts and a recovery phrase are pre-established through the user smart wallet.

The method may further include receiving, from an organization associated with the recovery agent, a confirmation of user identity of an owner of the user account.

The method may further include transferring a portion of the wallet items from the user smart wallet to the recovery agent.

According to some embodiments, there is provided a system including: a processor; and a memory having stored thereon computer program code that, when executed by the processor, controls the processor to: configure a first smart contract to authorize a second smart contract to initiate transfer of wallet items registered to the first smart contract to a location specified by the second smart contract; configure the second smart contract to initiate transfer of the wallet items from the first smart contract in response to receiving a first recovery verifier; receive, via an API, a wallet recovery request associated with the first smart contract, the wallet recovery request specifying a third smart contract as being a recipient wallet; and based on the wallet recovery request and responsive to receiving the first recovery verifier, initiate a transfer of the wallet items from the first smart contract to the third smart contract.

The computer program code, when executed by the processor, may further control the processor to: configure the third smart contract to authorize the second smart contract to initiate transfer of wallet items registered to the third smart contract to a location specified by the second smart contract; and configure the second smart contract to initiate transfer of the wallet items from the third smart contract in response to receiving a second recovery verifier.

The computer program code, when executed by the processor, may further control the processor to instantiate the third smart contract.

Initiating the transfer of the wallet items from the first smart contract to the third smart contract may include initiating a transfer of a portion of the wallet items from the first smart contract to the second smart contract.

The system may be further configured to receive log-in credentials for a user account associated with the first smart contract and receive the wallet recovery request from the user account.

The first recovery verifier may include a multi-signal trigger received from a plurality of verifier smart contracts, each multi-signal trigger including a predetermined passcode.

BRIEF DESCRIPTION OF THE FIGURES

Implementations, features, and aspects of the disclosed technology are described in detail herein and are considered a part of the claimed disclosed technology. Other implementations, features, and aspects can be understood with reference to the following detailed description, accompanying drawings, and claims. Reference will now be made to the accompanying figures and flow diagrams, which are not necessarily drawn to scale.

DETAILED DESCRIPTION

According to some embodiments, smart contracts are utilized to provide recovery processes for blockchain wallets. As one of ordinary skill will recognize in light of the present disclosure, smart contracts are self-executing, with the "terms of the agreement" written as lines of code, which may be embedded within or associated with one or more smart wallets. This code may exist across a distributed ledger network (e.g., a blockchain network). When conditions for the agreement are met, the code is carried out automatically, without the need for an external enforcement mechanism. A first smart contract is utilized as a blockchain wallet, creating a smart wallet. The smart wallet registers with a recovery agent, and registers the recovery agent. As will be understood to one of ordinary skill in light of the present disclosure, the recovery agent may be a smart wallet that exists on a same blockchain as the first smart contract, and can therefore transact with the smart wallet via the blockchain. Registering the recover agent may include the smart wallet executing a function within the recovery agent, passing the smart wallet address to the recovery agent, and receiving the recovery agent address in response. The smart wallet sets the recovery agent as a trusted address and is set-up to accept requests from the recovery agent. Meanwhile, the recovery agent registers the smart wallet as a managed account. If the owner of the smart wallet misplaces his key, the recovery agent sends an instruction to the smart wallet to transfer the assets to a new smart wallet.

The smart wallet may establish one or more conditions for the recovery agent to establish the new smart wallet. For example, the recovery agent may require indications from a plurality of trusted third-party smart-contracts (e.g., wallets of friends) and/or a signal from a trusted institution (e.g., an email or code from a custodian of the recovery agent).

Aspects of the present disclosure will now be discussed in greater detail with reference to the figures.

Figure 1:
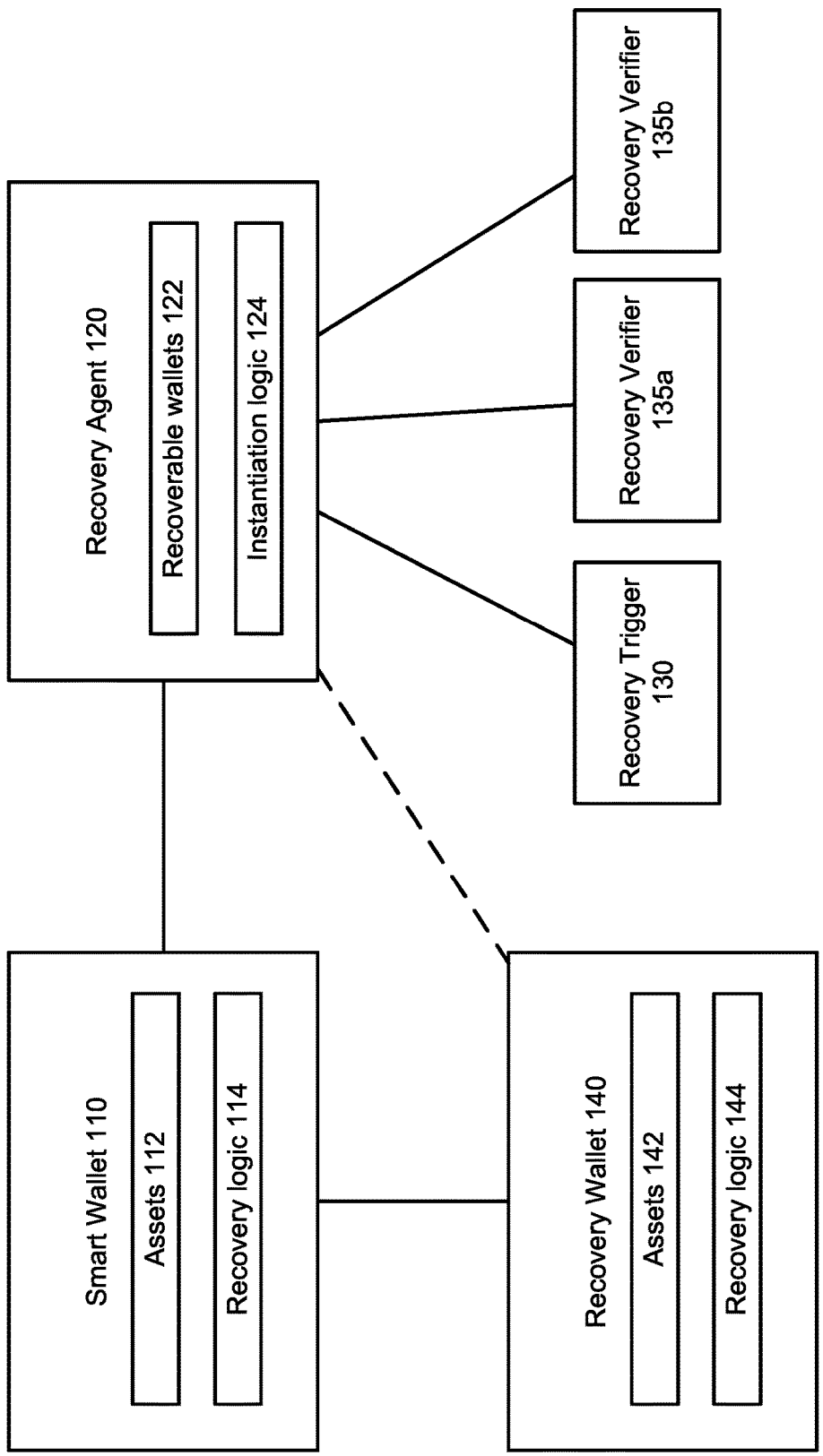
FIG. 1 illustrates an example environment in which certain aspects of the present disclosure may be implemented.

FIG. 1 illustrates an example environment 100 in which certain aspects of the present disclosure may be implemented. Environment 100 includes a smart wallet 110 (first smart contract), a recovery agent 120 (second smart contract), recovery trigger 130, recovery verifiers 135a and 135b, and a recovery wallet 140 (third smart contract). The smart wallet 110, recovery agent 120, and recovery wallet 140 all reside on (e.g., have addresses on) the blockchain. Recovery trigger 130 and recovery verifier 135a and 135b may reside either on the blockchain or off the blockchain depending on a specific implementation. For example, recovery trigger 130 may be an instruction received, for example, through a web application associated with the owner of the recovery agent 120. In some instances, recovery trigger 130 may include an authorized user of recovery agent 120 manually initiating instantiation logic 124 (e.g., in response to a call or other request from the owner of smart wallet 110). In certain cases, the owner of smart wallet 110 may instruct recovery trigger 130 (such as through logging into an account associated with the owner of smart wallet 110). Recovery trigger 130 may initiate a recovery protocol (e.g., within instantiation logic 124) of recovery agent 120. One of ordinary skill will recognize that recovery trigger 130 may call into recovery agent 120, e.g., through a variety of APIs. Meanwhile, recovery verifiers 135a and 135b may include a verification process, such as one or more of biometric verification, in-person verification (e.g., by bringing an ID to a physical address), passcode verification, security questions, and/or a multi-signal voting by one or more additional smart contracts on the blockchain.

Smart wallet 110 includes logic code (recovery logic 114) for instituting account recovery. Smart wallet 110 registers the recovery agent 120 by storing its address as authorized to initiate the recovery logic 114. In some cases, the recovery logic 114 includes an address for the recovery wallet 140. In other cases, the recovery agent 120 provides the address for the recovery wallet 140 to the smart wallet. When the recovery logic is activated, the assets 112 of smart wallet 110 are transferred to the assets 142 of the recovery wallet 140. Registering the recover agent 120 may include the smart wallet 110 executing a function (e.g., logic) within the recovery agent 120, passing the smart wallet 110 address to the recovery agent 120, and receiving the recovery agent 120 address in response.

Recovery agent 120 includes a list of smart wallets 122 (e.g., smart wallet addresses) that it is authorized to recover. Recovery agent 120 may initiate the recovery logic 114 in smart wallet 110 to transfer the assets 112 to recovery wallet 140, for example, by transmitting a recovery instruction to smart wallet 110. In some cases, recover agent 120 may include instantiation logic 124 for instantiating recovery wallet 140 prior to initiating the recovery logic 114. The instantiation logic 124 may modify an existing code file (e.g., template) of a recovery wallet to generate a case-specific recovery wallet 140 (e.g., by providing a delivery address associated with the owner of smart wallet 110, such as an e-mail address, for delivery of the recovery wallet 140 private key). As will be understood by one of ordinary skill in light of the present disclosure, the contents of the recovery wallet 140 continue to be stored on the blockchain. In some cases, portions of the template may be unalterable (e.g., a trigger to return assets to smart wallet 110 under certain conditions). When recovery agent 120 instantiates recovery wallet 140, recovery agent 120 may add the address of recovery wallet 140 to its list of wallets 122.

Recovery wallet 140 may store the assets 142 received from smart wallet 110. Once instantiated, recovery wallet 140 may be substantially similar to smart wallet 110, and may include recovery logic 144 configured to cause recovery wallet 140 to transfer its assets to a new wallet in response to instructions from recovery agent 120. Once all the assets of the recovery wallet 140 are transferred to the new wallet, recovery wallet 140 may, in some cases, be deleted from the blockchain (e.g., the recover wallet 140 address may be deregistered from the blockchain). However, this is merely an example and, in some cases, recovery wallet 140 may, in some cases, merely have no assets registered thereto, but may be used again in future recovery processes.

Figure 2:
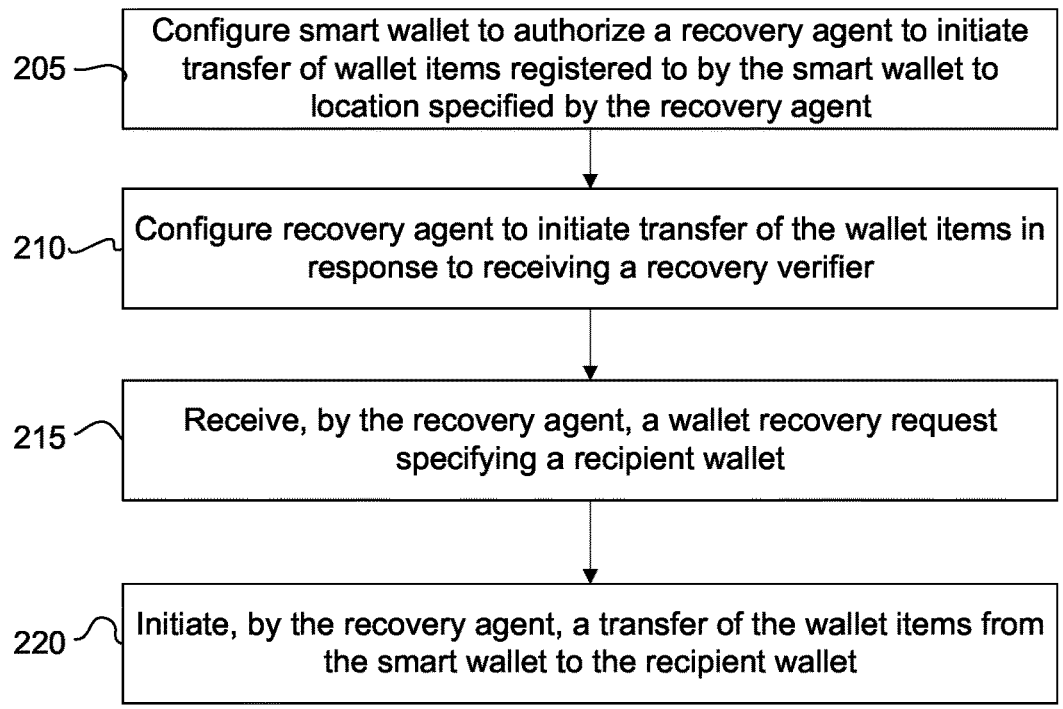
FIG. 2 is a flowchart of establishing a wallet recovery system according to an example embodiment.

FIG. 2 is a flowchart 200 of a wallet recovery method according to an example embodiment. The method may be performed, for example, in the environment 100 of FIG. 1. The method of FIG. 2 may include configuring 205 smart wallet 110 (e.g., a first smart contract) to authorize recovery agent 120 (e.g., a second smart contract) to initiate transfer of assets 112 (e.g., wallet items) registered to smart wallet 110 to a location specified by recovery agent 120. For example, smart wallet 110 may include recovery code 114 that executes a routine for transferring assets 112 out of smart wallet 110. The recovery code 114 may be configured to accept initiation from recovery agent 120 (e.g., from the recovery agent 120 address).

The method may further include configuring 210 recovery agent 120 to initiate transfer of the assets 112 from smart wallet 110 in response to receiving a recovery verifier. For example, recovery agent 120 may include a recovery routine that is configured to include smart wallet 110 (e.g., an address for smart wallet 110) as a wallet that it is authorized to recover. As a non-limiting example, the recovery verifier may include a multi-signal trigger from a plurality of verifier smart contracts (e.g., recovery verifiers 130a and 130b). In some cases, the recovery routine may initiate contact with recovery verifiers 130a and 130b, such as through blockchain calls to recovery verifiers 130a and 130b (if recover verifiers 130 and 130b exist on the blockchain) or by generating and transmitting email or text messaging communications with accounts/phone numbers associated with recovery verifiers 130a and 130b (if they exist outside of the blockchain). In some implementations, recovery agent 120 may call a function within smart wallet 110, and smart wallet 110 contacts recovery verifiers 130a and 130b. The multi-signal trigger may include a predetermined passcode sent from each of recovery verifiers 130a and 130b. In some cases, the recovery verifier may include verification from a trusted oracle (e.g., an indication that the owner of smart wallet 110 has verified their identity in person to the owner of recovery agent 120) and/or biometric validation.

The method may include receiving 215 (e.g., via an API and recovery agent 120), a wallet recovery request associated with the first smart contract. The wallet recovery request may specify recovery wallet 140 (e.g., a third smart contract) as being a recipient wallet for assets 112. However, this is merely an example. In some cases, recovery agent 120 may instantiate recovery wallet 140 in response to receiving a recovery request. In certain instances, recovery wallet 140 may be specified by smart wallet 110 (or a user associated with smart wallet 110) prior to receiving 215 the recovery request. The recovery wallet 140 may be configured (e.g., by recovery agent 120) to authorize recovery agent 120 to initiate transfer of assets 142 registered to the recovery wallet 140 to a location specified by recovery agent 120.

Based on the wallet recovery request and responsive to receiving the recovery verifier, recovery agent 120 initiates 220 a transfer of assets 112 from smart wallet 110 to recovery wallet 140. In some cases, initiating the transfer of assets 112 from smart wallet 110 to recovery wallet 140 includes transferring of a portion of assets 112 from smart wallet 110 to recovery agent 120.

Figure 3:
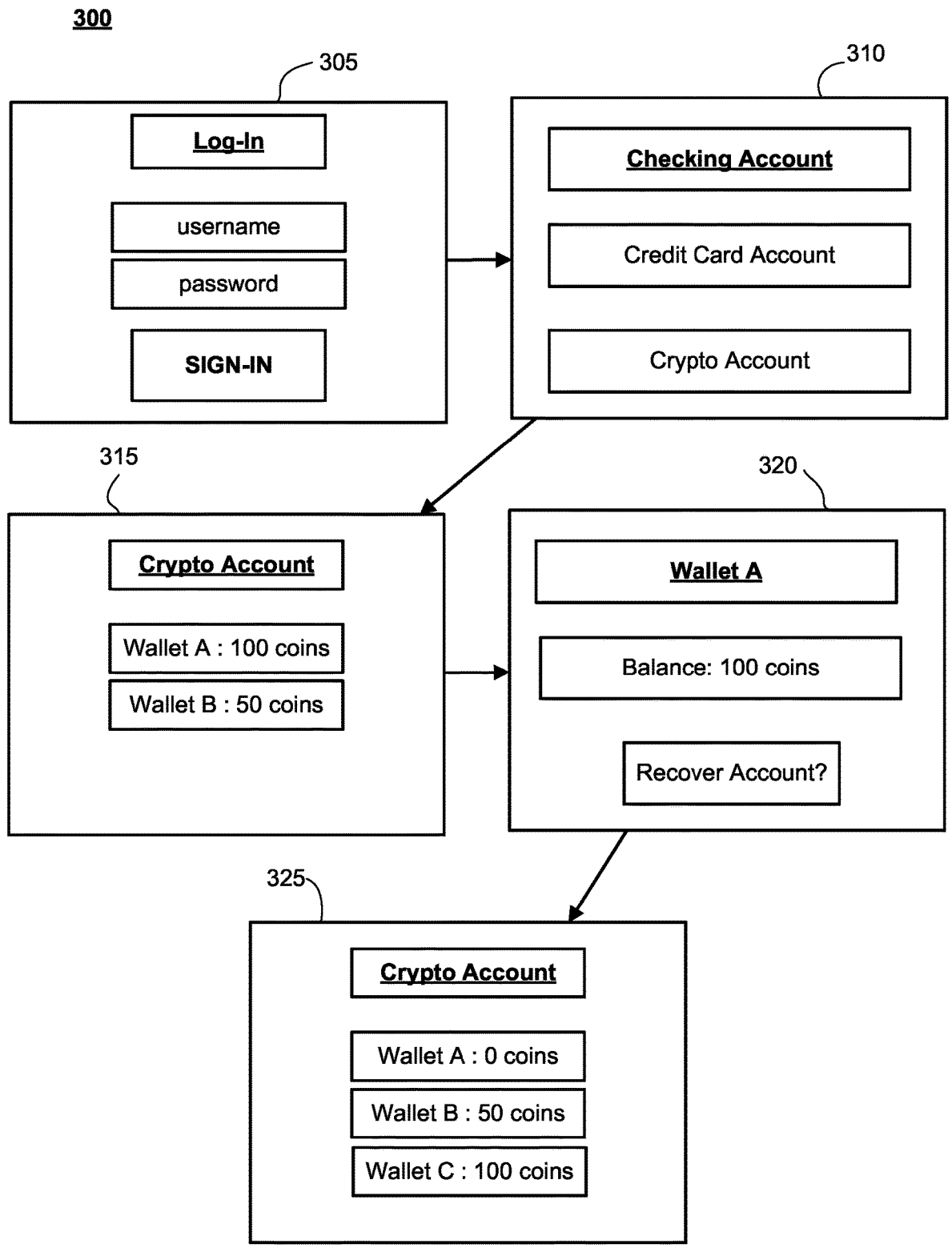
FIG. 3 is a flow diagram depicting wallet recovery according to an example embodiment.

FIG. 3 is a flow diagram 300 depicting wallet recovery according to an example embodiment. In the example depicted in FIG. 3, the wallet is associated with a user account, for example, at a financial institution. At 305, a user logs-in to their user account. Logging-in to the user account may include providing log-in credentials (e.g., username and password) into a webform. In some cases, multi-factor authentication may be required to log-into the user account. At 310 a plurality of registered accounts are presented to the user. As depicted, the registered accounts include a checking account, a credit card account, and a crypto-currency ("crypto"), account, or blockchain account. However, this is merely an example. Selecting one of the registered accounts navigates to more information about the selected account. For example, at 315, the user has selected crypto account.

Crypto account 315 includes Wallet A (containing 100 coins) and Wallet B (containing 50 coins). If Wallet A is selected, screen 320 is provided, specifying additional details and/or options with regards to Wallet A. In particular, the user may, from the user account, request recovery of Wallet A (e.g., smart wallet 110). By requesting recovery for Wallet A, a recovery request is sent to recovery agent 120 (e.g., by an owner of a private key of recovery agent 120 initiating a recovery function of recovery agent 120). Thus, the user account may include recovery trigger 130 for recovering Wallet A. Once the recovery request is verified, crypto account is updated to include Wallet C (e.g., recovery wallet 140). As shown at 325, the crypto account includes Wallet A, Wallet B, and Wallet C. However, Wallet A no has no assets 112 and these were transferred to Wallet C. One of ordinary skill will recognize that this is merely an example, and various changes, modifications, and/or additions may be made to FIG. 3 according to various embodiments.

Figure 4:
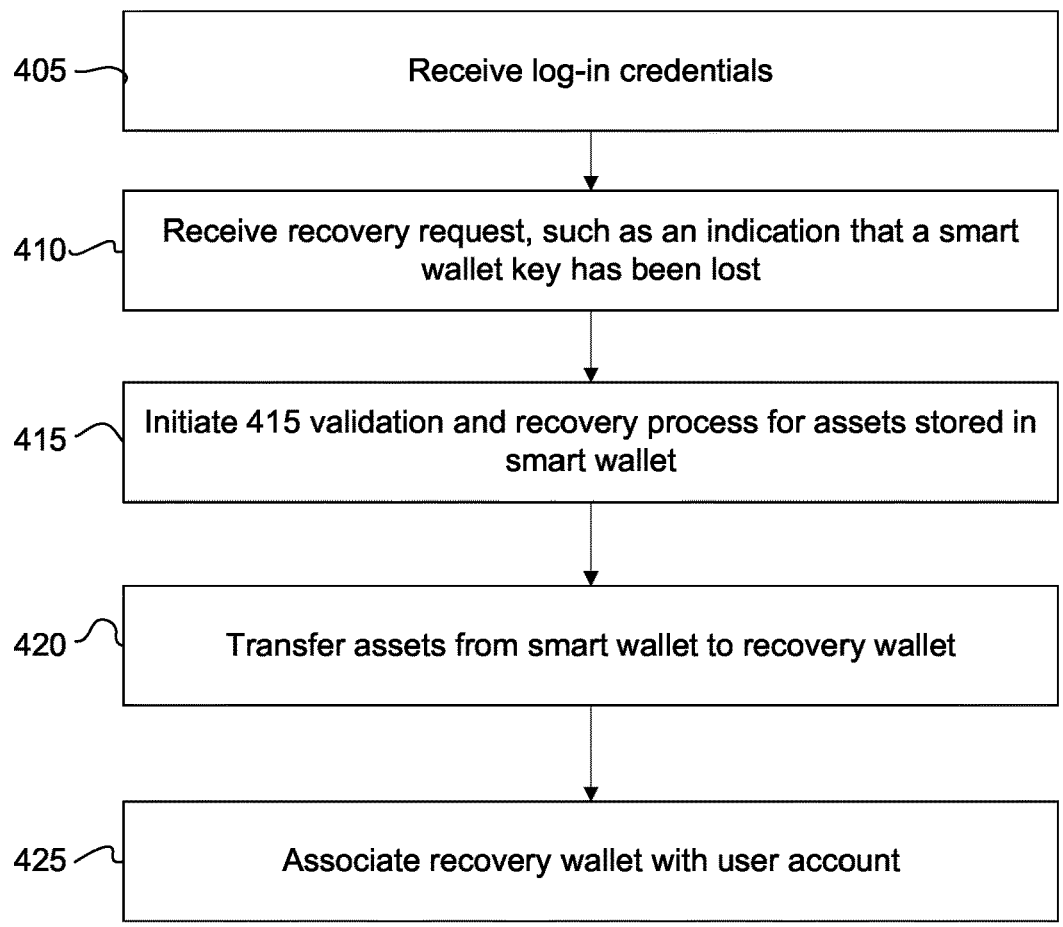
FIG. 4 is a flowchart of a wallet recovery method according to an example embodiment.

FIG. 4 is a flowchart 400 of a wallet recovery method according to an example embodiment. The method may be conducted by, for example, recovery agent 120 and/or systems associated with recovery agent 120. Referring to FIG. 4, recovery agent 120 receives 405 (e.g., from a user device) log-in credentials associated with a user account. Recovery agent 120 may be owned by a custodian of the user account. In some cases, the user account may be registered with a financial institution. Further, the user account may be associated with smart wallet 110.

Recovery agent 120 may receive 410 (e.g., from the user device), an indication that a key for the smart wallet 110 has been lost. For example, the user account may provide a request field to request recovery of smart wallet 110. Recovery agent 120 may then initiate 415 a validation and recovery process for assets 112 stored in smart wallet 110. The recovery process may include instantiating recovery wallet 140. In some cases, recovery wallet 140 may be configured to authorize recovery agent 120 to initiate transfer of assets 142 from recovery wallet 140.

Recovery agent 120 may then transfer 420 (e.g., instruct smart wallet 110 to transfer) of assets 112 to the recovery wallet 140 and associate 425 recovery wallet 140 with the user account. In some cases, recovery agent 120 may only transfer 420 assets 112 if the recovery request is verified. For example, recovery agent 120 may require that recovery verifiers 135a and 135b transmit a predetermined recovery phrase to recovery agent 120. In some cases, recovery verifiers 135a and 135b may be pre-established through the user account and/or through smart wallet 110. In certain instances, recovery agent 120 may further instruct smart wallet 110 to transfer a portion of assets 112 from smart wallet 110 to the recovery agent 120.

Figure 5:
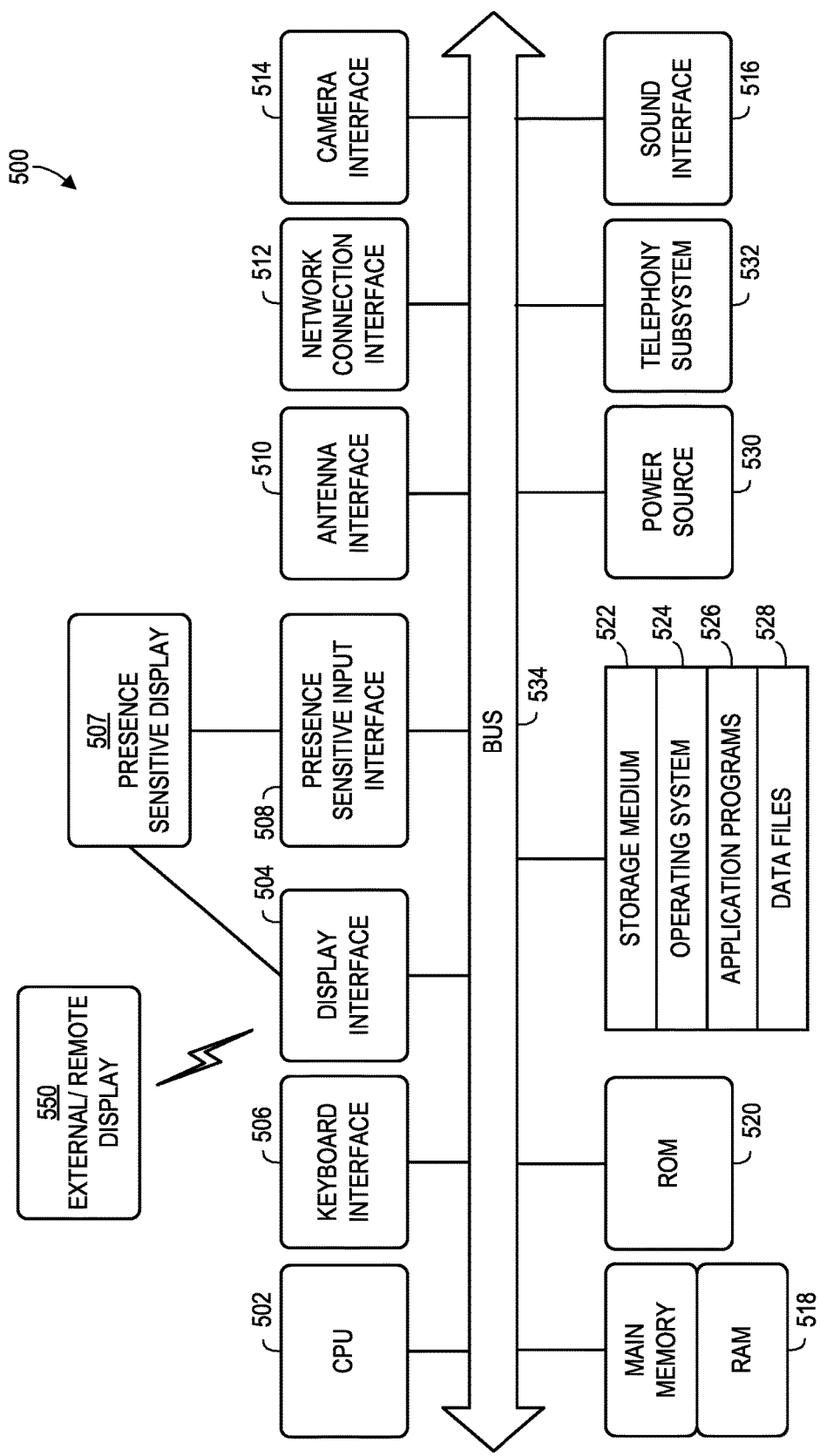
FIG. 5 is a computer architecture diagram according to an example embodiment.

Aspects of the disclosed technology may be implementing using at least some of the components illustrated in the computing device architecture 500 of FIG. 5. As shown, the computing device architecture includes a central processing unit (CPU) 502, where computer instructions are processed; a display interface 504 that acts as a communication interface and provides functions for rendering video, graphics, images, and texts on the display. In certain example implementations of the disclosed technology, the display interface 504 may be directly connected to a local display, such as a touch-screen display associated with a mobile computing device. In another example implementation, the display interface 504 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 504 may wirelessly communicate, for example, via a Wi-Fi channel or other available network connection interface 512 to the external/remote display.

In an example implementation, the network connection interface 512 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 504 may be operatively coupled to a local display, such as a touch-screen display associated with a mobile device. In another example, the display interface 504 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 504 may wirelessly communicate, for example, via the network connection interface 512 such as a Wi-Fi transceiver to the external/remote display.

The computing device architecture 500 may include a keyboard interface 506 that provides a communication interface to a keyboard. In one example implementation, the computing device architecture 500 may include a presence-sensitive display interface 508 for connecting to a presence-sensitive display 507. According to certain example implementations of the disclosed technology, the presence-sensitive display interface 508 may provide a communication interface to various devices such as a pointing device, a touch screen, a depth camera, etc. which may or may not be associated with a display.

The computing device architecture 500 may be configured to use an input device via one or more of input/output interfaces (for example, the keyboard interface 506, the display interface 504, the presence sensitive display interface 508, network connection interface 512, camera interface 514, sound interface 516, etc.) to allow a user to capture information into the computing device architecture 500. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 500 or may be a separate device. For example, the input device may be an accelerometer, a magnetometer, a digital camera, a microphone, and an optical sensor.

Example implementations of the computing device architecture 500 may include an antenna interface 510 that provides a communication interface to an antenna; a network connection interface 512 that provides a communication interface to a network. As mentioned above, the display interface 504 may be in communication with the network connection interface 512, for example, to provide information for display on a remote display that is not directly connected or attached to the system. In certain implementations, a camera interface 514 is provided that acts as a communication interface and provides functions for capturing digital images from a camera. In certain implementations, a sound interface 516 is provided as a communication interface for converting sound into electrical signals using a microphone and for converting electrical signals into sound using a speaker. According to example implementations, a random-access memory (RAM) 518 is provided, where computer instructions and data may be stored in a volatile memory device for processing by the CPU 502.

According to an example implementation, the computing device architecture 500 includes a read-only memory (ROM) 520 where invariant low-level system code or data for basic system functions such as basic input and output (I/O), startup, or reception of keystrokes from a keyboard are stored in a non-volatile memory device. According to an example implementation, the computing device architecture 500 includes a storage medium 522 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 (including, for example, a web browser application, a widget or gadget engine, and or other applications, as necessary) and data files 528 are stored.

According to an example implementation, the computing device architecture 500 includes a power source 530 that provides an appropriate alternating current (AC) or direct current (DC) to power components.

According to an example implementation, the computing device architecture 500 includes and a telephony subsystem 532 that allows the device 500 to transmit and receive sound over a telephone network. The constituent devices and the CPU 502 communicate with each other over a bus 534.

According to an example implementation, the CPU 502 has appropriate structure to be a computer processor. In one arrangement, the CPU 502 may include more than one processing unit. The RAM 518 interfaces with the computer bus 534 to provide quick RAM storage to the CPU 502 during the execution of software programs such as the operating system application programs, and device drivers. More specifically, the CPU 502 loads computer-executable process steps from the storage medium 522 or other media into a field of the RAM 518 in order to execute software programs. Data may be stored in the RAM 518, where the data may be accessed by the computer CPU 502 during execution. In one example configuration, the device architecture 500 includes at least 58 MB of RAM, and 256 MB of flash memory.

The storage medium 522 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 522, which may include a machine-readable storage medium.

According to one example implementation, the term computing device, as used herein, may be a CPU, or conceptualized as a CPU (for example, the CPU 502 of FIG. 5). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example embodiment, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As used in this application, the terms "component," "module," "system," "server." "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

An embodiment of the present disclosure may be implemented according to at least the following:

Clause 1: A method of recovering blockchain wallet items, the method including: configuring a first smart contract to authorize a second smart contract to initiate transfer of wallet items registered to the first smart contract to a location specified by the second smart contract; configuring the second smart contract to initiate transfer of the wallet items from the first smart contract in response to receiving a first recovery verifier; receiving, via an API and by the second smart contract, a wallet recovery request associated with the first smart contract, the wallet recovery request specifying a third smart contract as being a recipient wallet; and based on the wallet recovery request and responsive to receiving the first recovery verifier, initiating, by the second smart contract, a transfer of the wallet items from the first smart contract to the third smart contract.

Clause 2: The method of clause 1 further including: configuring the third smart contract to authorize the second smart contract to initiate transfer of wallet items registered to the third smart contract to a location specified by the second smart contract; and configuring the second smart contract to initiate transfer of the wallet items from the third smart contract in response to receiving a second recovery verifier.

Clause 3: The method of clause 2, wherein the second recovery verifier is identical to the first recovery verifier.

Clause 4: The method of any of clauses 1-3 further including instantiating, by the second smart contract, the third smart contract.

Clause 5: The method of any of clauses 1-4, wherein initiating the transfer of the wallet items from the first smart contract to the third smart contract includes initiating a transfer of a portion of the wallet items from the first smart contract to the second smart contract.

Clause 6: The method of any of clauses 1-5, wherein the wallet recovery request is received from a user account associated with the first smart contract.

Clause 7: The method of any of clauses 1-6, wherein the first recovery verifier includes receiving a multi-signal trigger from a plurality of verifier smart contracts.

Clause 8: The method of clause 7 further including configuring the second smart contract to accept the multi-signal trigger from the plurality of verifier smart contracts.

Clause 9: The method of clauses 7 or 8 wherein the multi-signal trigger includes a predetermined passcode sent from each of the plurality of verifier smart contracts.

Clause 10: A system including: a processor; and a memory having stored thereon computer program code that, when executed by the processor, controls the processor to: configure a first smart contract to authorize a second smart contract to initiate transfer of wallet items registered to the first smart contract to a location specified by the second smart contract; configure the second smart contract to initiate transfer of the wallet items from the first smart contract in response to receiving a first recovery verifier; receive, via an API, a wallet recovery request associated with the first smart contract, the wallet recovery request specifying a third smart contract as being a recipient wallet; and based on the wallet recovery request and responsive to receiving the first recovery verifier, initiate a transfer of the wallet items from the first smart contract to the third smart contract.

Clause 11: The system of clause 10, wherein the computer program code, when executed by the processor, further controls the processor to: configure the third smart contract to authorize the second smart contract to initiate transfer of wallet items registered to the third smart contract to a location specified by the second smart contract; and configure the second smart contract to initiate transfer of the wallet items from the third smart contract in response to receiving a second recovery verifier.

Clause 12: The system of clauses 10 or 11, wherein the computer program code, when executed by the processor, further controls the processor to instantiate the third smart contract.

Clause 13: The system of any of clauses 10-12, wherein initiating the transfer of the wallet items from the first smart contract to the third smart contract includes initiating a transfer of a portion of the wallet items from the first smart contract to the second smart contract.

Clause 14: The system of any of clauses 10-13, wherein the system is further configured to receive log-in credentials for a user account associated with the first smart contract and receive the wallet recovery request from the user account.

Clause 15: The system of any of clauses 10-14, wherein the first recovery verifier includes a multi-signal trigger received from a plurality of verifier smart contracts, each multi-signal trigger including a predetermined passcode.

Clause 16: A method of recovering blockchain wallet items, the method including: receiving, from a user device, log-in credentials associated with a user account; receiving, from the user device, an indication that a key associated with a user smart wallet associated with the user account has been lost; initiating a validation and recovery process for items stored in the user smart wallet; instantiating a recovery smart wallet; transferring the items stored in the user smart wallet to the recovery smart wallet; and associating the recovery smart wallet with the user account.

Clause 17: The method of clause 16 further including configuring the recovery smart wallet to authorize a recovery agent to initiate transfer of wallet items registered to the recovery smart wallet to a location specified by the recovery agent.

Clause 18: The method of clauses 16 or 17 further including receiving, from a plurality of verifier smart contracts, a predetermined recovery phrase, wherein the verifier smart contracts and a recovery phrase are pre-established through the user smart wallet.

Clause 19: The method of any of clauses 16-18 further including receiving, from an organization associated with the recovery agent, a confirmation of user identity of an owner of the user account.

Clause 20: The method of any of clauses 16-19 further including transferring a portion of the wallet items from the user smart wallet to the recovery agent.

Clause 21: A non-transitory computer readable medium having stored thereon computer program code that contains instructions for executing a method according to any of clauses 1-9 and 16-20.

Example Use Case

The following example use case describes an example of a use of systems and methods for recovery of blockchain assets. The example use case is intended solely for explanatory purposes and not for limitation. In an embodiment, a customer uses his bank to recover a blockchain wallet. The blockchain wallet includes recovery logic that can be initiated by a recovery agent associated with the bank. The customer may log-in to their bank profile, and indicate that they have lost the key to their wallet. The bank may verify that the customer truly wants to initiate the recovery process, for example, by requiring the customer to bring an ID to the bank, by requiring trusted-third parties (e.g., designated third-parties), or by requiring a recovery phrase to verify that the customer does want their wallet to be recovered. When the customer's request is verified, the recovery agent instructs the customer's wallet to transfer its assets into a new wallet. The customer may either have the key for the new wallet (i.e., if the new wallet was previously established by the customer), or the bank may provide the new wallet's key to the customer.

What is claimed is:

1. A method of recovering blockchain wallet items, the method comprising:
   configuring a first smart contract with a recovery logic authorizing a second smart contract to initiate transfer of one or more wallet items registered to the first smart contract to a recipient wallet specified by the second smart contract;
   receiving, by the second smart contract, a wallet recovery request received from a user account associated with the first smart contract;
   generating, by an instantiation logic of the second smart contract, a third smart contract as the recipient wallet, by registering the third smart contract to a blockchain at a third blockchain address, wherein the third smart contract is customized to the user account by using the instantiation logic to modify an existing code file of a template recovery wallet based on user account attributes, the user account attributes comprising at least a delivery method for providing a private key associated with the third smart contract to a user associated with the user account;

receiving, by the second smart contract, a first recovery verifier;

relaying, by the second smart contract, the third blockchain address of the third smart contract to the recovery logic; and initiating by the second smart contract, a transfer of the one or more wallet items from the first smart contract to the third smart contract by executing a routine of the recovery logic.

2. The method of claim 1 further comprising:
configuring the third smart contract to authorize the second smart contract to initiate transfer of one or more wallet items registered to the third smart contract to a blockchain address specified by the second smart contract; and configuring, by one or more processors, the second smart contract to initiate transfer of the one or more wallet items from the third smart contract in response to receiving a second recovery verifier.

3. The method of claim 2, wherein the second recovery verifier is identical to the first recovery verifier.

4. The method of claim 1, further comprising:
responsive to the completion of the transfer of the one or more wallet items from the first smart contract to the third smart contract, deregistering the third blockchain address of the third smart contract from the blockchain.

5. The method of claim 1, wherein initiating the transfer of the one or more wallet items from the first smart contract to the third smart contract comprises initiating a transfer of a portion of the one or more wallet items from the first smart contract to the second smart contract.

6. The method of claim 1, further comprising: delivering to the user, the private key associated with the third smart contract, via the delivery method specified in the modified code file of the third smart contract.

7. The method of claim 1, wherein:
the first recovery verifier comprises receiving a multi-signal trigger from a plurality of verifier smart contracts, the method further comprises configuring the second smart contract to accept the multi-signal trigger from the plurality of verifier smart contracts, and the multi-signal trigger comprises a predetermined passcode sent from each of the plurality of verifier smart contracts.

8. The method of claim 1, wherein:
the delivery method specified in the modified code file of the third smart contract is email; and the third smart contract is configured with an additional recovery logic to initiate transfer of one or more wallet items registered to the third smart contract to a recipient wallet blockchain address specified by the second smart contract.

9. The method of claim 1, wherein:
the existing code file of the template recovery wallet further comprises one or more unalterable portions, wherein the one or more unalterable portions comprises conditions to initiate return of the one or more wallet items to the first smart contract.

10. A system for recovering blockchain wallet items comprising:
one or more processors;
a transceiver; and
a memory having stored thereon computer program code that, when executed by the processor, controls the one or more processors to:
configure a first smart contract with a recovery logic configured to receive a recovery blockchain address that authorizes a second smart contract to initiate transfer of one or more wallet items registered to the first smart contract to the recovery blockchain address specified by the second smart contract;

receive, via the transceiver, a wallet recovery request from a user account associated with the first smart contract;

generate, by an instantiation logic of the second smart contract, a third smart contract as a recipient wallet, by registering the third smart contract to the blockchain at a third blockchain address, wherein the third smart contract is customized to the user account by using the instantiation logic to modify an existing code file of a template recovery wallet based on user account attributes;

receive, via the transceiver, a first recovery verifier;

relay, using the second smart contract, the third blockchain address of the third smart contract to the recovery logic of the first smart contract; and initiate a transfer of the one or more wallet items from the first smart contract to the third smart contract by executing a routine of the recovery logic.

11. The system of claim 10, wherein the computer program code, when executed by the one or more processors, further controls the one or more processors to:
configure the third smart contract to authorize the second smart contract to initiate transfer of one or more wallet items registered to the third smart contract to a blockchain address specified by the second smart contract; and configure the second smart contract to initiate transfer of the one or more wallet items from the third smart contract in response to receiving a second recovery verifier.

12. The system of claim 10, wherein:
the user account attributes comprise at least a delivery method for providing a private key associated with the third smart contract to a user associated with the user account.

13. The system of claim 10, wherein initiating the transfer of the one or more wallet items from the first smart contract to the third smart contract comprises initiating a transfer of a portion of the one or more wallet items from the first smart contract to the second smart contract.

14. The system of claim 10, wherein:
the existing code file of the template recovery wallet further comprises unalterable portions; and the system is further configured to receive log-in credentials for the user account associated with the first smart contract.

15. The system of claim 10, wherein the first recovery verifier comprises a multi-signal trigger received from a plurality of verifier smart contracts, each multi-signal trigger comprising a predetermined passcode.

16. A method of recovering blockchain wallet items, the method comprising:
receiving, by one or more processors from a user device, log-in credentials associated with a user account, wherein:

the user account is associated with a user smart wallet, the user smart wallet comprising a recovery logic; and the recovery logic is configured to allow a recovery agent to transfer items stored in the user smart wallet;

receiving, from the user device, an indication that a key associated with the user smart wallet associated with the user account has been lost;

initiating, by the one or more processors, the recovery agent;

instantiating, by the one or more processors, using an instantiation logic of the recovery agent, a recovery smart wallet, wherein the instantiation logic generates the recovery smart wallet based on a template recovery wallet and by registering the recovery smart wallet to the blockchain at a third blockchain address;

providing, by the recovery agent, the third blockchain address to the recovery logic;

transferring, by the one or more processors, the items stored in the user smart wallet to the recovery smart wallet by executing a routine of recovery logic; and associating, by the one or more processors, the recovery smart wallet with the user account.

17. The method of claim 16, further comprising receiving, with the one or more processors, from a plurality of verifier smart contracts, a predetermined recovery phrase, wherein the verifier smart contracts and a recovery phrase are pre-established through the user smart wallet.

18. The method of claim 16, wherein:
the user account attributes comprise at least a delivery method for providing a private key associated with the recovery smart wallet to an owner associated with the user account.

19. The method of claim 16, further comprising receiving, with the one or more processors, from an organization associated with the recovery agent, a confirmation of user identity of an owner of the user account.

20. The method of claim 16, further comprising transferring, with the one or more processors, a portion of the one or more wallet items from the user smart wallet to the recovery agent.

* * * * *